US011354467B2

(12) United States Patent
Westin et al.

(10) Patent No.: US 11,354,467 B2
(45) Date of Patent: *Jun. 7, 2022

(54) PREDICTING ELECTROSTATIC CHARGES IN A LIQUID CONTAINER

(71) Applicant: The Boeing Company, Chicago, IL (US)

(72) Inventors: Benjamin A. Westin, Charleston, SC (US); Travis G. Olson, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/810,539

(22) Filed: Mar. 5, 2020

(65) Prior Publication Data
US 2020/0202055 A1 Jun. 25, 2020

Related U.S. Application Data

(63) Continuation of application No. 15/782,485, filed on Oct. 12, 2017, now Pat. No. 10,606,969.

(51) Int. Cl.
*G06F 30/20* (2020.01)
*G06F 30/23* (2020.01)
(Continued)

(52) U.S. Cl.
CPC .............. *G06F 30/23* (2020.01); *G06F 30/20* (2020.01); *G06T 17/20* (2013.01); *B67D 7/3236* (2013.01);
(Continued)

(58) Field of Classification Search
CPC ....... B67D 7/3236; G06F 30/20; G06F 30/15; G06F 17/5095
See application file for complete search history.

(56) References Cited

U.S. PATENT DOCUMENTS 5,661,670 A 8/1997 Bharathan et al.
6,001,312 A 12/1999 Wang et al.
(Continued)

OTHER PUBLICATIONS

Bustin, W.M., et al., "A New Theory for Static Relaxation," *Hydrocarbon Processing*, Nov. 1964, vol. 43(11), pp. 209-216.
(Continued)

*Primary Examiner* — Kibrom K Gebresilassie
(74) *Attorney, Agent, or Firm* — Womble Bond Dickinson (US) LLP

(57) ABSTRACT

A method of predicting electrostatic charges in a liquid container is provided. The method includes generating a computer geometric model of the liquid container according to a design of the liquid container and generating executable code to reproduce fluid dynamics and electrostatic charge conservation during transfer of liquid into the liquid container. The method includes executing a simulating application to at least: perform a simulation of the transfer of liquid into the liquid container subject to the fluid dynamics and electrostatic charge conservation to produce a prediction of electrostatic charges in the liquid container during the transfer of liquid; and iterate the simulation to update the electrostatic charge conservation. The method includes outputting the prediction of electrostatic charges in the liquid container to enable certification of the design of the liquid container.

27 Claims, 9 Drawing Sheets

(51) Int. Cl.
*G06T 17/20* (2006.01)
*B67D 7/32* (2010.01)
*G06F 30/15* (2020.01)
*G06F 111/10* (2020.01)
*G06F 119/06* (2020.01)

(52) U.S. Cl.
CPC .......... *G06F 30/15* (2020.01); *G06F 2111/10* (2020.01); *G06F 2119/06* (2020.01)

(56) References Cited

U.S. PATENT DOCUMENTS

| | | | |
|---|---|---|---|
| 6,474,563 B2* | 11/2002 | Pletcher | B05B 5/1691 |
| | | | 222/402.1 |
| 2007/0028998 A1 | 2/2007 | Clifford | |
| 2010/0085679 A1 | 4/2010 | Makhratchev et al. | |
| 2012/0037649 A1 | 2/2012 | Schütz | |
| 2014/0217716 A1* | 8/2014 | Reynolds | B65D 90/52 |
| | | | 280/830 |
| 2014/0233017 A1* | 8/2014 | Hariram | G01N 15/14 |
| | | | 356/72 |
| 2014/0246440 A1* | 9/2014 | Kopiec | B60K 15/03177 |
| | | | 220/563 |
| 2017/0240226 A1 | 8/2017 | Brooks et al. | |
| 2019/0047843 A1* | 2/2019 | Tillotson | B67D 7/3236 |

OTHER PUBLICATIONS

Carruthers, J.A., et al., "The Estimation of Electrostatic Potentials, Fields, and Energies in Rectangular Metal Tank Containing Charged Fuel," Journal of the Institute of Petroleum, Jun. 1962, vol. 48(462), pp. 180-195.

Flow Science Inc.: "Electric Charge Distribution—FLOW-3D," Oct. 27, 2010, Retrieved from the Internet: URL:https://www.youtube.com/watch?v=nNWJiK0gy0Y [Retrieved on Mar. 19, 2019].

Močilan, M. et al., "Dynamic Analysis of Fuel Tank," *Procedia Engineering*, 2016, vol. 136, pp. 45-49.

Von Pidoll, Ulrich, "Worst case conditions for electrostatic tests of liquid handling systems," *Journal of Electrostatics*, 2013, vol. 71, pp. 1-5.

Von Pidoll, Ulrich, "Electrostatus ignition hazards in motor cars—occurrence, detection and avoidance," Informal No. 2, 84th GRSG, May 5-9, 2003, agenda item 8.

European Office Action dated Sep. 9, 2021 in corresponding European application No. 18194392.9.

* cited by examiner

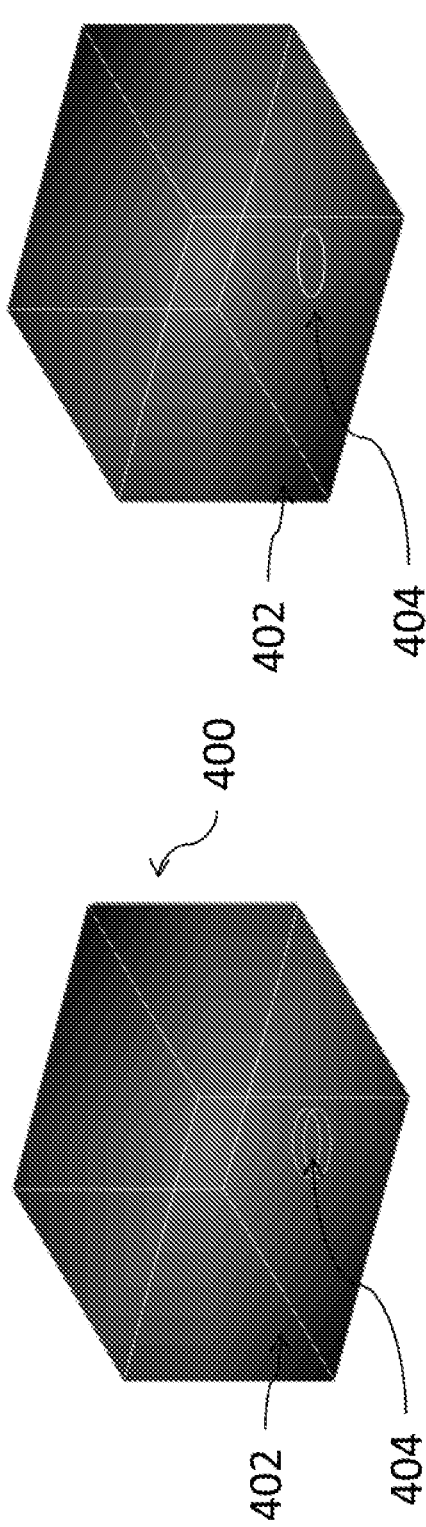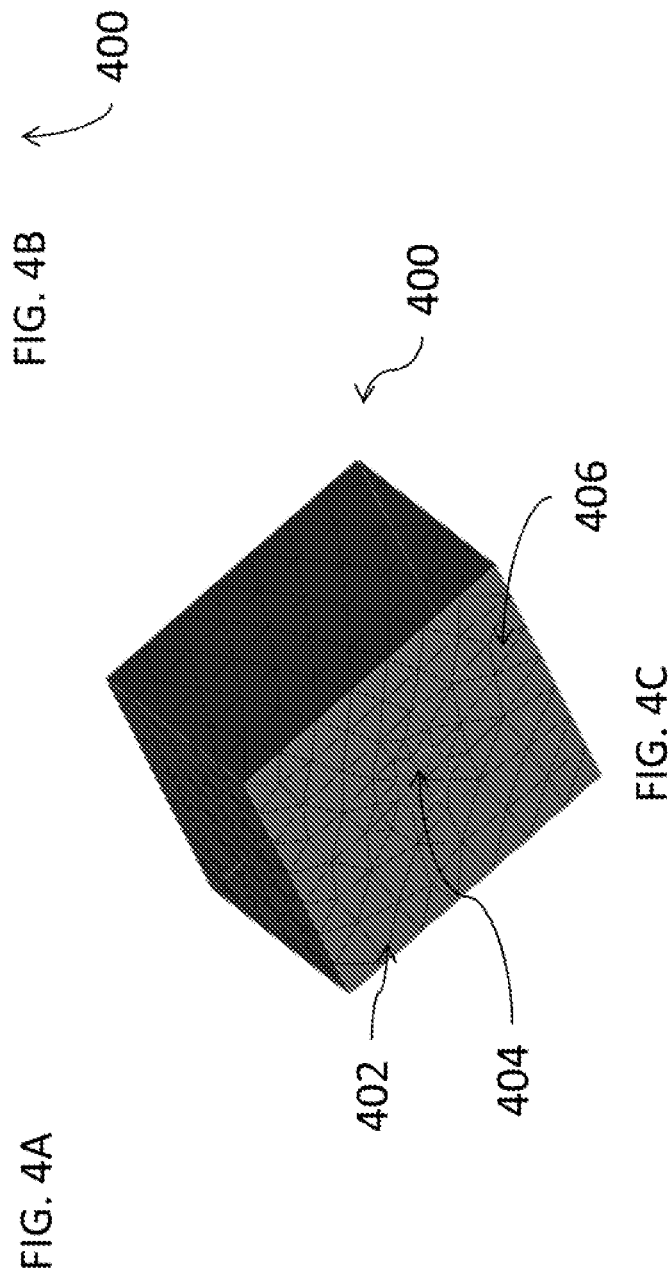
FIG. 4A
FIG. 4B
FIG. 4C

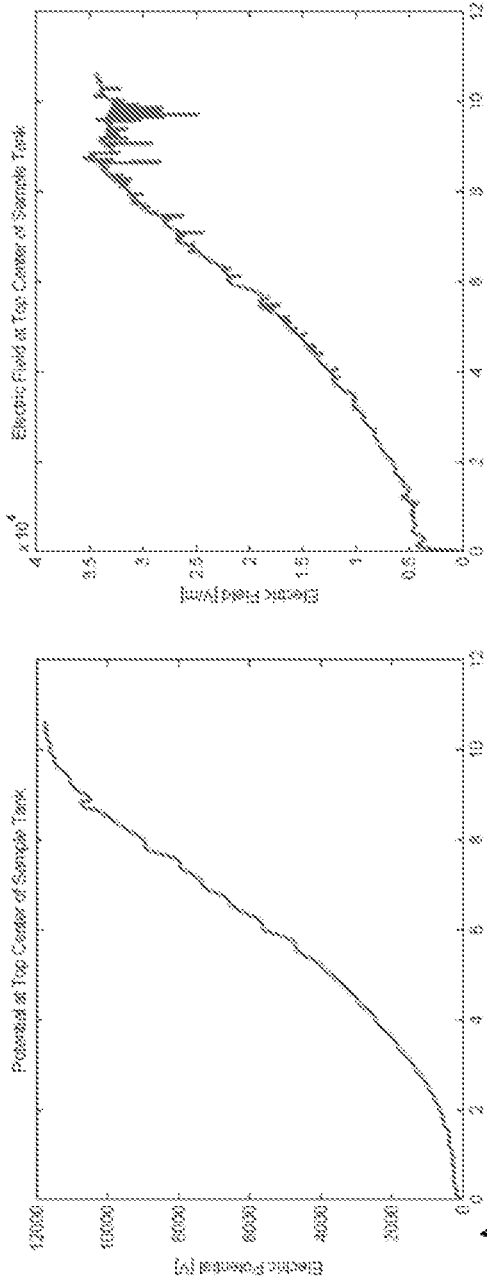
FIG. 7A
FIG. 7B
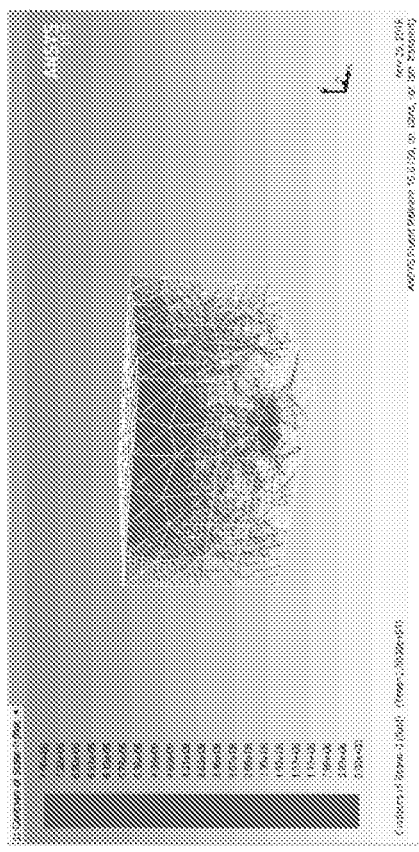
FIG. 7C

PREDICTING ELECTROSTATIC CHARGES IN A LIQUID CONTAINER

CROSS-REFERENCE TO RELATED APPLICATIONS

This application is a continuation of U.S. application Ser. No. 15/782,485, filed on Oct. 12, 2017, now U.S. Pat. No. 10,606,969, which application is hereby incorporated by reference in its entirety in this application.

TECHNOLOGICAL FIELD

The present disclosure relates generally to computational electrostatic predictive tools and, in particular, to predicting electrostatic charges in liquid containers.

BACKGROUND

During filling of a liquid container onboard a vehicle, such as a fuel tank onboard an aircraft, and during subsequent movement of the vehicle, build-up, transport, and relaxation of electrostatic charge in the liquid container may result in undesirable conditions within the liquid container. Such conditions are increased especially during the transfer of liquid into the liquid container. For example, a filter provided in the liquid container interacts with the incoming liquid such that the electric charge is stripped from the liquid and bulk polarization of the liquid is caused. Such charged liquid being transferred into the liquid container is able to interact with the surrounding environment of the container, where if enough electric potential builds up, electric arcing may occur. Risks including loss of functionality of the liquid container, electrical vulnerabilities of the liquid container, and the like are a logical by-product of the undesirable conditions that may result from the electrostatic charge build-up, transport, and relaxation.

In order to mitigate these risks, analysis teams use experimentation tools to understand and predict the risks. The teams may use this information to optimize the design of the liquid container and to certify that requirements for reliability and risk tolerance are met.

The design and certification of a liquid container, and any associated components, can be expensive and laborious. Current certification processes do not provide sufficient feedback to designers of the liquid container to understand the physical conditions and risks that the liquid container will be subjected to and to sufficiently improve the design and implementation accordingly. Shortcomings of the current processes include the absence of: genuine boundary conditions, electrostatic charge transport models, isolated conductors, fluid dynamics, which result in various generalizations and assumptions as to the liquid container's geometry, an inlet charge density, conductivity of the liquid, and liquid flow rate and, thus, lower-fidelity numerical predictive models than may be desirable.

Therefore it would be desirable to have an apparatus and method that takes into account at least some of the issues discussed above, as well as other possible issues.

BRIEF SUMMARY

Example implementations of the present disclosure are generally directed to an apparatus, and a corresponding method and computer-readable storage medium for predicting electrostatic charges in a liquid container. Example implementations provide computational models that develop a simulation for exploring the electrostatic charges during transfer of liquid into a liquid container such as a fuel tank onboard an aircraft. Utilization of the present disclosure has the potential to significantly reduce the costs associated with fuel tank testing as well as deliver certification of fuel containers based on higher-fidelity numerical predictive models including genuine boundary conditions, electrostatic charge transport models, isolated conductors, and fluid dynamics as opposed to models utilizing generalizations and assumptions. Such higher-fidelity numerical models greatly improve accuracy and the level of certification detail. Additionally, the present disclosure provides a framework for integrating sub-processes and provides predictive feedback.

Example implementations are primarily described in the context of fuel tanks onboard aircraft, but other liquid containers onboard aircraft and other vehicles are also contemplated. These other example implementations include liquid cryogenic systems in spacecraft, water ballast tanks in ships and submarines, and the like. More generally, these exemplary implementations include any tank or container used for liquid storage, including: integrated tanks, rigid and/or removable tanks, bladder tanks, tip tanks, conformal tanks, drop and/or pylon tanks, ballast tanks including saddle ballasts, cryogenic liquid tanks, septic tanks, and/or cooling tanks or reservoirs. In some aspects, a component and/or part of applicability may be included or otherwise associated with the liquid tank, including one or more of: fuel pumps, fuel filters, fuel injectors, seal caps, sensors, hoses, valves, clamps, plugs, screws, bolts, sealants, struts, pylons, baffles, and other components, as well as additional components of other vehicle liquid tanks and containers. The certification of the design of liquid tanks is a significant problem that spans these many different vehicle environments, systems, and components, all of which would fit into the proposed framework of example implementations of the present disclosure.

Example implementations disclosed herein provide certification teams with accurate, quantified, high-fidelity predictions of electrostatic charge(s). These high-fidelity predictions are not available via current experimental testing. Additionally, this approach reduces the associated experimentation costs through efficient framework integration of all certification sub-processes.

The present disclosure thus includes, without limitation, the following example implementations.

Some example implementations provide a method for predicting electrostatic charges in a liquid container, the method comprising generating a computer geometric model of the liquid container according to a design of the liquid container; generating executable code to reproduce fluid dynamics and electrostatic charge conservation during transfer of liquid into the liquid container; executing a simulating application, via a computer processor configured to access the computer geometric model and the executable code, to at least: perform a simulation of the transfer of liquid into the liquid container subject to the fluid dynamics and electrostatic charge conservation, and from the simulation, produce a prediction of electrostatic charges in the liquid container during the transfer of liquid; and iterate the simulation to update the electrostatic charge conservation to thereby refine the prediction of electrostatic charges in the liquid container during the transfer of liquid; and outputting the prediction of electrostatic charges in the liquid container to enable certification of the design of the liquid container based thereon.

In some example implementations of the method of any preceding or any subsequent example implementation, or any combination thereof, generating the executable code includes receiving selected fluid dynamics models from a database of fluid dynamics models including momentum, boundary conditions, volumetric flow rate, or volume charge density.

In some example implementations of the method of any preceding or any subsequent example implementation, or any combination thereof, generating the executable code includes receiving selected electrostatic charge transport models representative of electrostatic charge conservation from a database of electrostatic charge transport models including conduction, convection, diffusion, or mobility.

In some example implementations of the method of any preceding or any subsequent example implementation, or any combination thereof, executing the simulating application includes solving the selected electrostatic charge transport models during transfer of liquid into the liquid container.

In some example implementations of the method of any preceding or any subsequent example implementation, or any combination thereof, generating the computer geometric model includes generating a finite element model comprising a system modeled by a set of finite elements interconnected by nodes.

In some example implementations of the method of any preceding or any subsequent example implementation, or any combination thereof, solving the selected electrostatic charge transport models includes, for each node of the nodes, extracting data from the node and solving for an electric potential at the node using on the electrostatic charge transport models during transfer of liquid into the liquid container.

In some example implementations of the method of any preceding or any subsequent example implementation, or any combination thereof, executing the simulating application to iterate the simulation includes retrieving the electric potential data at each node of the nodes, and integrating the electric potential data at each node of the nodes with the electrostatic charge transport models such that electrostatic charge conservation during the transfer of liquid into the liquid container is updated.

In some example implementations of the method of any preceding or any subsequent example implementation, or any combination thereof, executing the simulating application includes calculating boundary conditions inside the liquid container including liquid container inlet boundary conditions at which liquid is transferred into the liquid container, air-liquid boundary conditions, conducting liquid container boundary wall conditions, dielectric liquid container boundary wall conditions, and mixed liquid container boundary conditions.

In some example implementations of the method of any preceding or any subsequent example implementation, or any combination thereof, outputting the prediction of electrostatic charges in the liquid container includes, in at least one other instance: producing a modified design of the liquid container based on the prediction of electrostatic charges in the liquid container; generating a modified computer geometric model of the liquid container according to the modified design; and re-executing the simulating application via the computer processor configured to access the modified computer geometric model and the executable code.

Some example implementations provide an apparatus for predicting electrostatic charges in a liquid container. The apparatus comprises a processor and a memory storing executable instructions that, in response to execution by the processor, cause the apparatus to at least: generate a computer geometric model of the liquid container according to a design of the liquid container; generate executable code to reproduce fluid dynamics and electrostatic charge conservation during transfer of liquid into the liquid container; execute a simulating application, via the processor configured to access the computer geometric model and the executable code, to at least: perform a simulation of the transfer of liquid into the liquid container subject to the fluid dynamics and electrostatic charge conservation, and from the simulation, produce a prediction of electrostatic charges in the liquid container during the transfer of liquid; and iterate the simulation to update the electrostatic charge conservation to thereby refine the prediction of electrostatic charges in the liquid container during the transfer of liquid; and output the prediction of electrostatic charges in the liquid container to enable certification of the design of the liquid container based thereon.

Some example implementations provide a computer-readable storage medium that is non-transitory and has computer-readable program code portions stored therein that in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 4A is a computer geometric model of a liquid container and an inlet cylinder of the liquid container, according to principles of the present disclosure;

FIG. 4B is a computer geometric model of the inlet cylinder integrated within the liquid container of FIG. 4A, according to principles of the present disclosure;

FIG. 4C is a finite element model of the inlet cylinder integrated within the liquid container of FIG. 4B, according to principles of the present disclosure;

Figure 2:
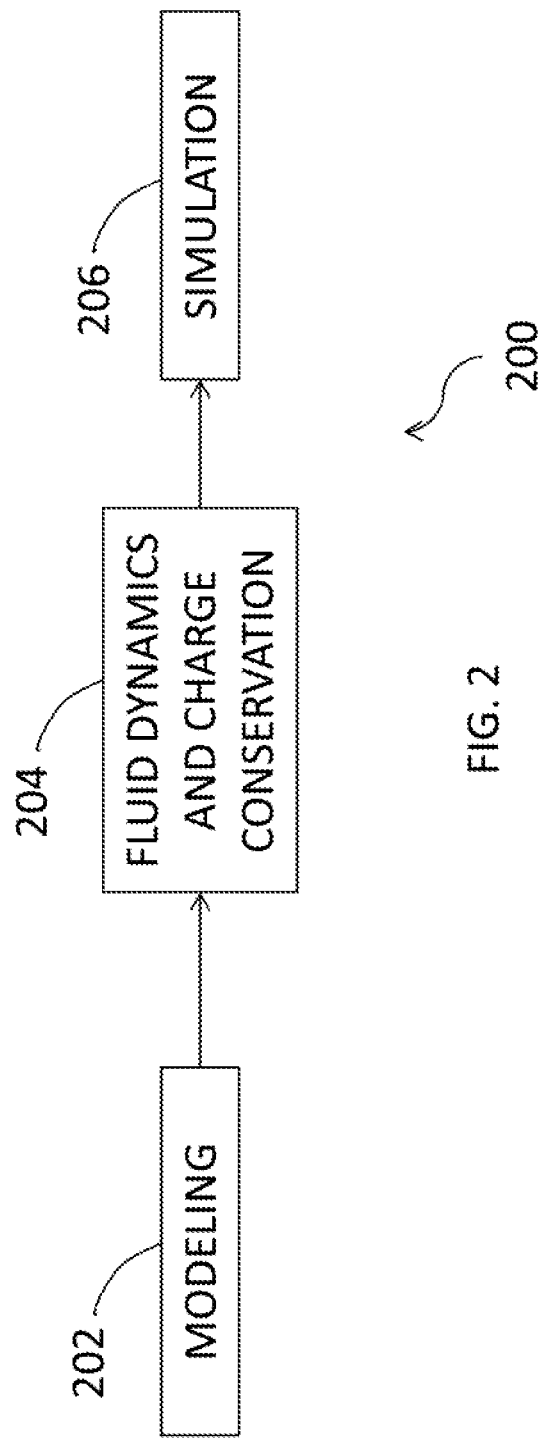
FIG. 2 is a block diagram of a system for predicting electrostatic charges in a liquid container for manufacture of the liquid container, according to example implementations of the present disclosure.
Figure 8:
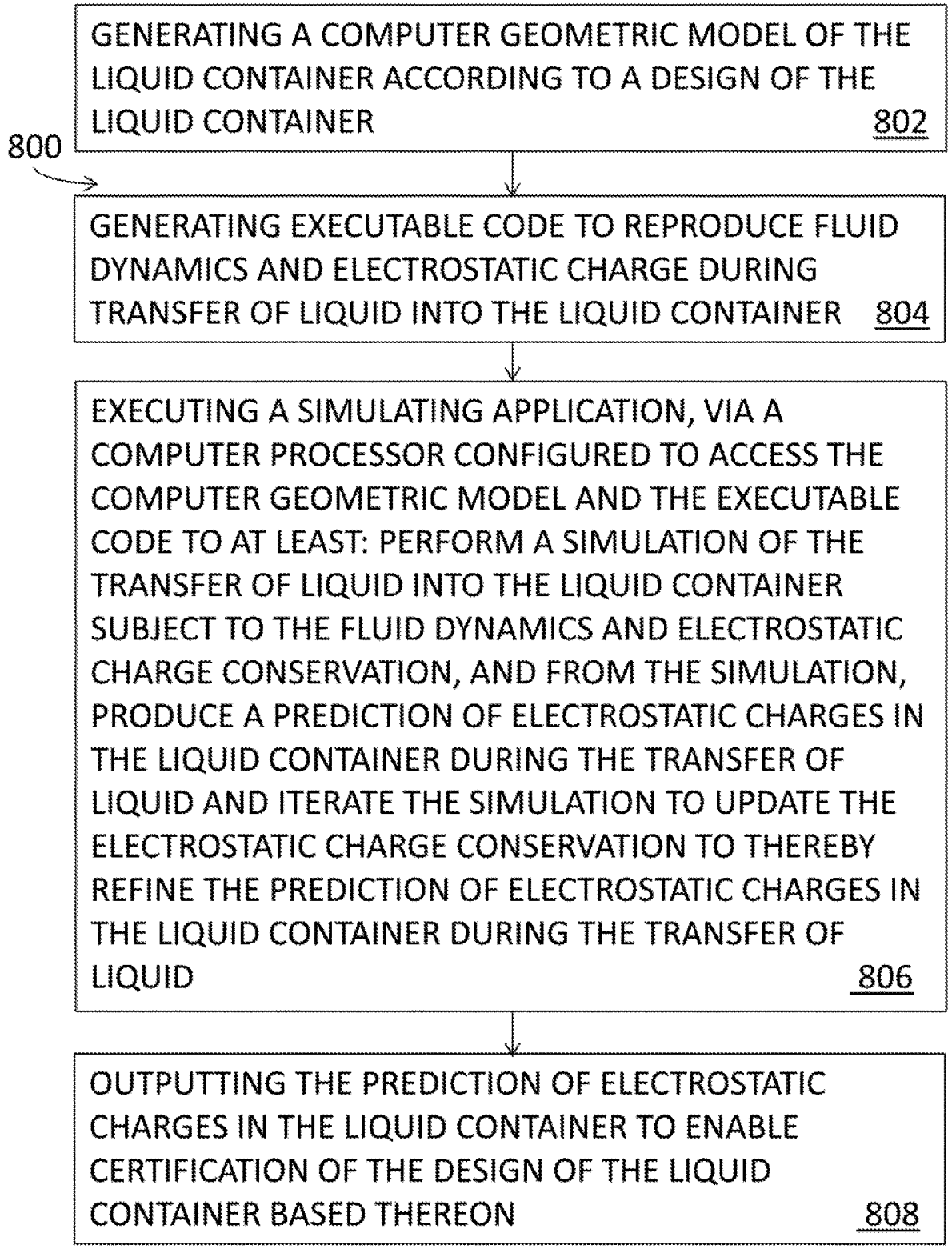
Figure 9:
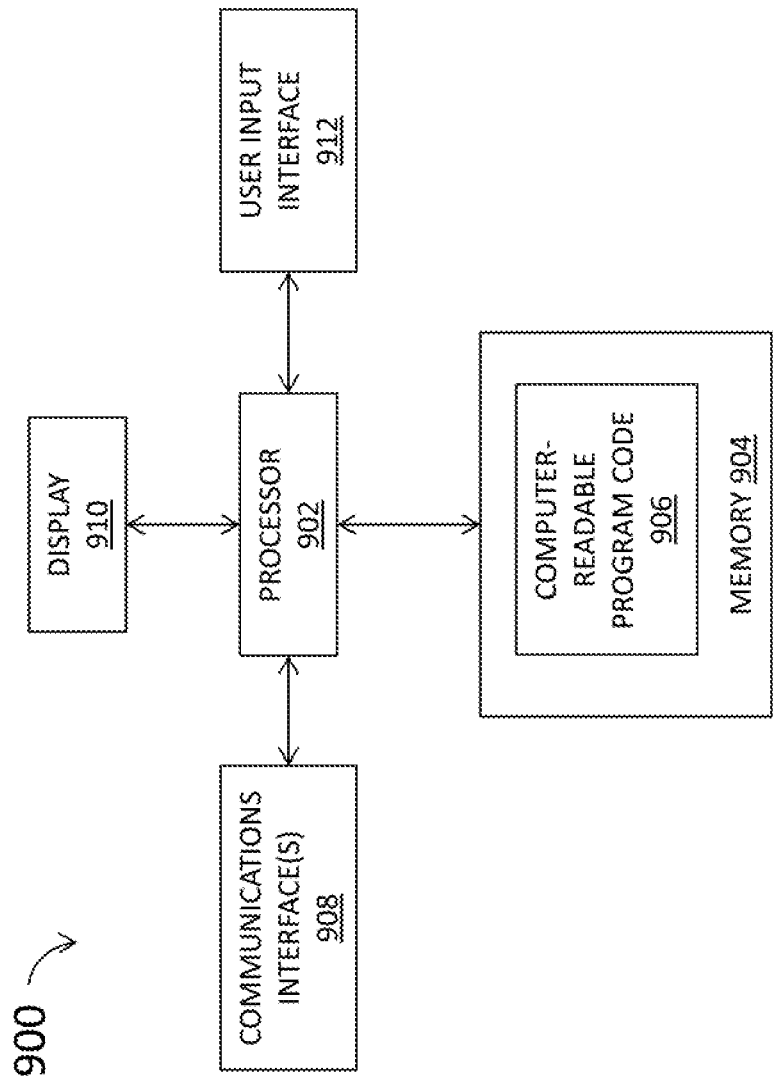

FIGS. 7A, 7B, and 7C are sample graphical outputs of the system of FIG. 2, according to example implementations of the present disclosure;

FIG. 8 is a flowchart illustrating operations in a method of predicting electrostatic charges in a liquid container, according to example implementations of the present disclosure; and FIG. 9 illustrates an apparatus according to some example implementations.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to an apparatus, and corresponding method and computer-readable storage medium for predicting electrostatic charges in a liquid container onboard a vehicle. As used herein, "electrostatic charge(s)" refers to any potential undesirable condition resulting from electrostatic charge build-up, transport, and/or relaxation in metal and composite liquid containers before, during, and after the transfer of liquid into the container. In some examples, these undesirable conditions include electrostatic charges, voltages, quantities of surface charge density sufficiently large to cause propagating brush discharge, electric fields or potentials sufficiently large to cause voltage arcs, and the like.

Example implementations may be described in the context of a fuel tank onboard an aircraft, but it should be understood that example implementations may be equally applicable to liquid containers onboard other vehicles. For example, implementations of the current disclosure may also be applicable to spacecraft with liquid cryogenic systems, ships and submarines with water ballast tanks and automobiles with fuel tanks. The prediction of electrostatic charges in such liquid containers is desirable to use in the certification of a design and/or determination of in-service guidelines (e.g., refuel times) for several different vehicle environments and systems, all of which are within the scope of the framework of the current disclosure.

An example implementation of the current invention includes certification of the design of a fuel tank of an aircraft. The current analysis of a fuel tank during refuel includes some assumptions and simplifications, which does not provide the most accurate prediction of electrostatic charges during refuel. Currently, the tank geometry of the fuel tank is assumed as a rectangular box with perfectly conducting sides. Conditions of fluid dynamics are not simulated in the refuel process. Thus, the action of refuel treats incoming fuel as relaxing exponentially based on the conductivity of the fuel, where the time constant is primarily influenced by ohmic relaxation. The fuel is treated as having a completely mixed, uniform charge distribution throughout the fuel tank, where the "charge distribution" or "electrostatic charge distribution" refers to a density of the electric field over a particular region. As such, arbitrary tank geometries, fluid dynamics, non-perfect electric conductor (PEC) boundary conditions, and/or isolated conductors are not accounted for using the current analysis methods.

Figure 1:
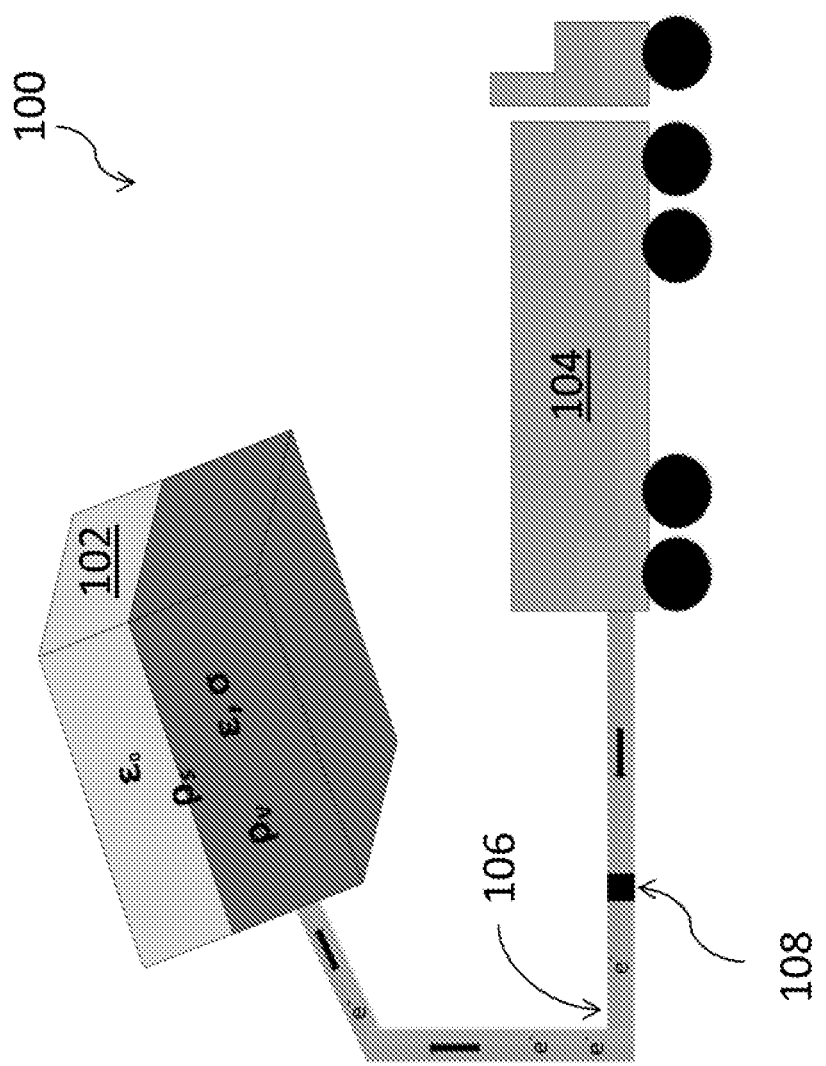
FIG. 1 is a schematic illustration of a refueling system, according to example implementations of the present disclosure.

FIG. 1 illustrates an exemplary refueling system generally designated 100. The refueling system 100 comprises, in some examples, a liquid container 102, such as a fuel tank, that is configured to receive liquid from a liquid transfer device 104, such as a fuel truck via a conduit 106. During delivery of the liquid via the conduit 106, one or more components disposed within the liquid container 102, the conduit 106, or otherwise integrated within the refueling system 100 may interact with the liquid and impact the electrostatic charge distribution. For example, and as illustrated in FIG. 1, a filter 108 disposed in-line with the conduit 106 may interact with the liquid by stripping electrical charge therefrom, thereby creating a bulk polarization in the liquid delivered to the liquid container 102.

Example implementations of the present disclosure make use of computational models to develop a simulation for exploring the action of refueling a fuel tank to predict electrostatic charges therein. In this way, the example implementations of the present disclosure enable certification of the design of a liquid container such as a fuel tank to assess undesirable conditions during refueling. FIG. 2 illustrates a block diagram of a system 200 for predicting electrostatic charges in a liquid container onboard a vehicle, according to example implementations of the present disclosure. The system 200 is configured to perform a number of different functions or operations, either automatically, under direct operator control, or some combination of thereof. In this regard, in some examples, the system 200 is configured to perform one or more of its functions or operations automatically, that is, without being directly controlled by an operator. Additionally or alternatively, in some examples, the system 200 is configured to perform one or more of its functions or operations under direct operator control.

The system 200 may include one or more of each of any of a number of different subsystems (each an individual system) for performing one or more of its functions or operations. As shown, for example, the system 200 may include a modeling subsystem 202, a fluid dynamics and charge conservation subsystem 204, and a simulation subsystem 206 coupled to one another. Although being shown together as part of the system 200, it should be understood that either of the subsystems may function or operate as a separate system without regard to the other. And further, it should be understood that the system 200 may include one or more additional or alternative subsystems than those shown in FIG. 2.

The modeling subsystem 202 is generally configured to generate a computer geometric model of the liquid container according to a design of the liquid container. The fluid dynamics and electrostatic charge conservation subsystem 204 is generally configured to generate executable code to reproduce fluid dynamics and electrostatic charge conservation during transfer of liquid into the liquid container.

The simulation subsystem 206 is generally configured to execute a simulating application, via a computer processor configured to access the computer geometric model and the executable code, to at least perform a simulation of the transfer of liquid into the liquid container subject to the fluid dynamics and electrostatic charge conservation, and from the simulation, produce a prediction of electrostatic charges in the liquid container during the transfer of liquid. The simulating application is further configured to iterate the simulation to update the electrostatic charge conservation to thereby refine the prediction of electrostatic charges in the liquid container during the transfer of liquid. The prediction of the build-up and transport of the electrostatic charge in the liquid container is configured to be output to enable certification of the design of the liquid container based thereon.

Figure 3:
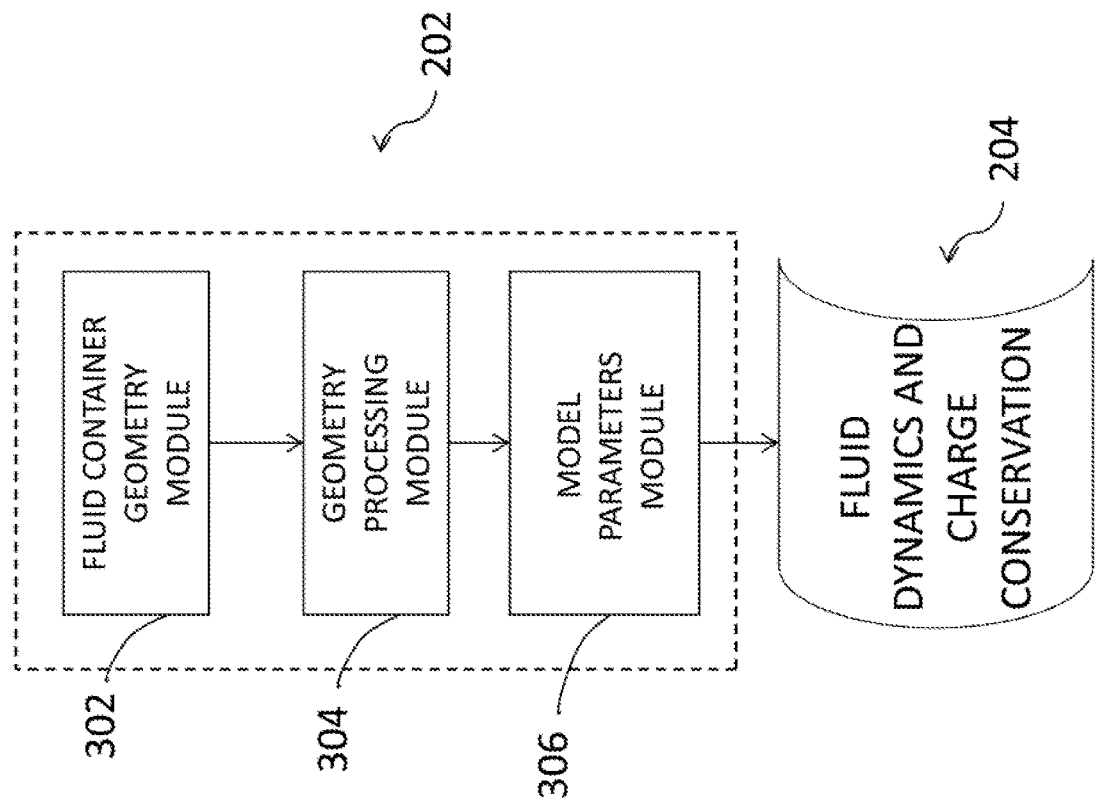
FIG. 3 is a block diagram that more particularly illustrates a modeling subsystem of the system of FIG. 2, according to example implementations of the present disclosure.

FIG. 3 is a block diagram of the modeling subsystem 202 according to some example implementations. As indicated, the modeling subsystem 202 is generally configured to generate a computer geometric model of the liquid container according to the design of the liquid container. A fluid container geometry module 302 generates an initial fluid container geometry file for the liquid container in which geometry of the liquid container and/or associated components (e.g., inlet cylinder) are defined. In some examples, the liquid container is one or more interconnected bay of containers. In some other examples, the liquid container is a rectangular prism. However, other non-standard liquid container geometries and components may be modeled using the fluid container geometry module 302. The fluid container geometry file is created utilizing a computer-aided design (CAD) tool or other parametric geometry design tool, such as Patran. As such, the initial fluid container geometry file comprises, in some examples, a solid model of the liquid container and any associated components.

A geometry processing module 304 is configured to integrate and further process the solid model of the liquid container and any associated components generated by the fluid container geometry module 302. For example, where the fluid container geometry module 302 generates a liquid container and an inlet cylinder penetrating through the liquid container, the geometry processing module 304 is configured to merge the inlet cylinder and the liquid container into a single volume. In another example, the geometry processing module 304 is configured to generate a finite element model of the liquid container and any associated components comprising a system modeled by a set of finite elements interconnected by nodes. In this example, the set of finite elements interconnected by nodes are configured to be meshed, so that the finite element model comprises a plurality of cells defined by the interconnected nodes. In some aspects, each of the plurality of cells is a tetrahedron.

In a still further example, the geometry processing module 304 is configured to define an inlet charge density and/or inlet boundary conditions at the inlet cylinder penetrating through the liquid container. Notably, and to be described further with regard to boundary conditions, the inlet cylinder defining an inlet for the liquid container may provide a different type of boundary as that compared to boundary conditions within an interior of the liquid container (e.g., interior walls or surfaces of the liquid container). As such, the inlet boundary conditions at the inlet cylinder of the liquid container may be particularly designated at the geometry processing module 304 as a particular zone, and a volumetric flow rate (m/s) and/or an inlet charge density (C/m3) at this particular zone may be defined.

A model parameters module 306 is configured to define or more simulation parameters prior to launch of the simulation. The model parameters module 306 is configured to define, for example, gravitational acceleration, time step of the simulation (e.g., 2.5 ms), total time steps (e.g., 4000), relaxation per time step (i.e., how much time charge will relax per time step, e.g., 10 s), data output frequency (e.g., 1/s), etc. In this manner, the simulation parameters defined by the model parameters module 306 are used to determine a duration of the simulation (i.e., total time steps) in view of the volumetric flow rate and a desired fill level of the liquid container.

FIGS. 4A-4C illustrate three different stages of generating, by the modeling subsystem 202, a computer geometric model of the liquid container and an inlet cylinder as described above, the computer geometric model being designated 400. In FIG. 4A, an initial fluid container geometry file is generated in which a solid model of a liquid container embodied respectively as a fuel tank 402 and an inlet cylinder 404 is provided. In FIG. 4B, the fuel tank 402 and the inlet cylinder 404 are merged into a single volume. In FIG. 4C, the fuel tank 402 and the inlet cylinder 404 are meshed to generate a finite element model of the liquid container 404 having the inlet cylinder 404 integrated therewith, the finite element model comprising a plurality of cells defined by interconnected nodes 406.

Referring back to FIG. 2, again, the fluid dynamics and charge conservation subsystem 204 is configured to generate executable code to reproduce fluid dynamics and electrostatic charge conservation during transfer of liquid into the liquid container. The fluid dynamics include momentum, volumetric flow rate, boundary conditions, or volume charge density and are selectable and/or receivable from a database storing a plurality of fluid dynamics models (e.g., functions, equations, relationships, etc.) In some instances, for example, the fluid dynamics and charge conservation subsystem 204 is configured to receive one or more, two or more, etc., of the fluid dynamics models from the plurality of fluid dynamics models stored in the database. Additional fluid dynamics models may become available as added to the database as needed.

The fluid dynamics and charge conservation subsystem 204 is also configured to receive selected electrostatic charge transport models representative of electrostatic charge conservation from a database storing a plurality of electrostatic charge transport models including conduction, convection, diffusion, and/or mobility. In some instances, for example, the fluid dynamics and charge conservation subsystem 204 is configured to receive one or more, two or more, etc., of the electrostatic charge transport models from the plurality of electrostatic charge transport models stored in the database. Additional electrostatic charge transport models may become available as added to the database as needed.

The simulation subsystem 206 is configured to execute a simulating application, via a computer processor configured to access the computer geometric model and the executable code, to at least perform a simulation of the transfer of liquid into the liquid container subject to the fluid dynamics and electrostatic charge conservation models. The simulation subsystem 206 is configured to produce a prediction of electrostatic charges in the liquid container during the transfer of liquid based on the simulation. As liquid continues to be transferred into the liquid container, the simulation is iterated, to update the electrostatic charge conservation and thereby refine the prediction of electrostatic charges in the liquid container during the transfer of liquid. More particularly, the fluid dynamics and the electrostatic charge transport models are iteratively solved during the transfer of liquid to refine the prediction of the electrostatic charges in the liquid container as the container continues to fill with liquid. In some examples, the simulation subsystem 206 includes a computational fluid dynamics (CFD) software package. Other computational models could be substituted based on specified fidelity preferences.

Figure 5:
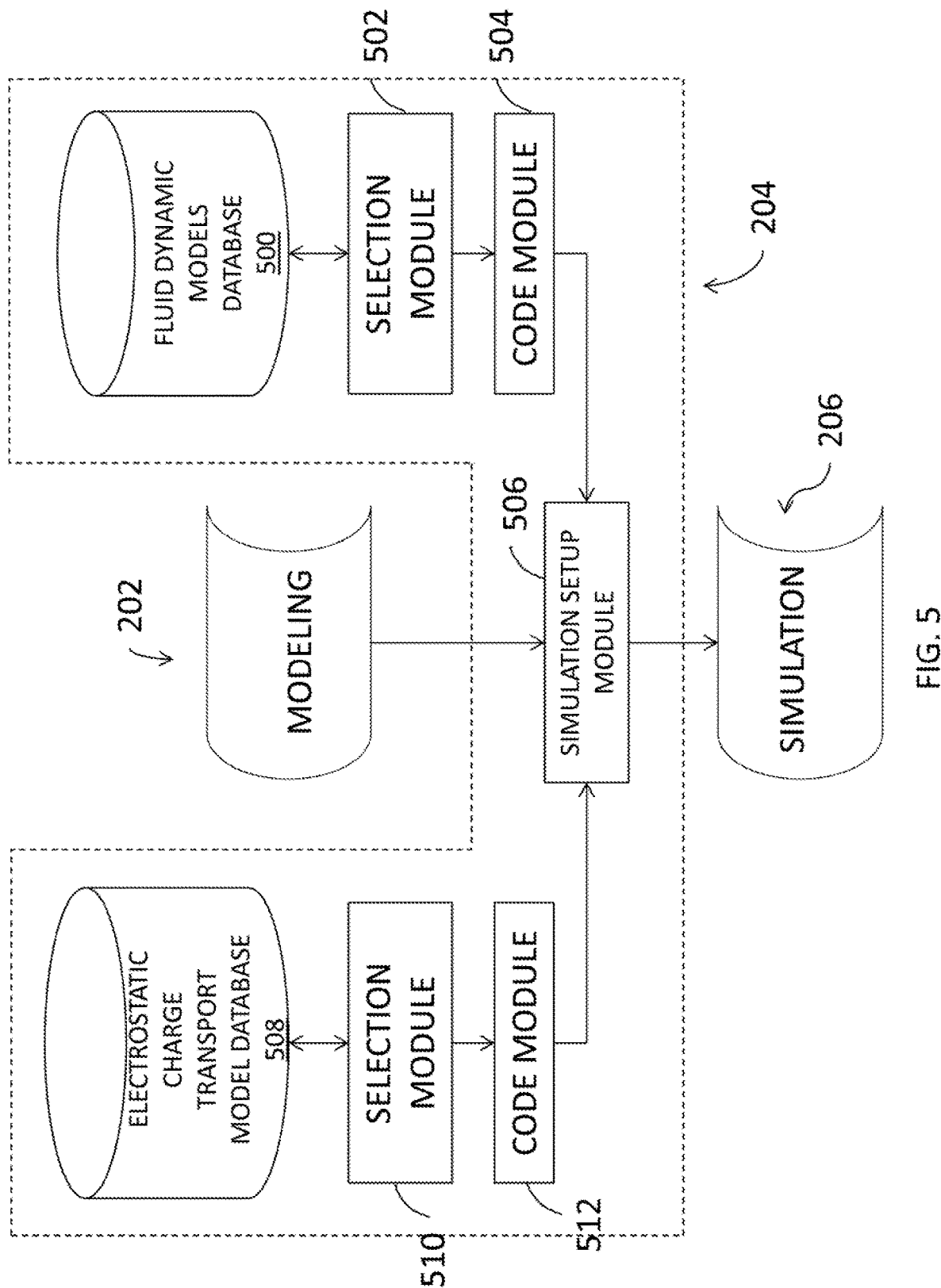
FIG. 5 is a block diagram that more particularly illustrates a fluid dynamics and charge conservation subsystem of the system of FIG. 2, according to some example implementations of the present disclosure.

FIG. 5 is a block diagram that more particularly illustrates the fluid dynamics and charge conservation subsystem 204. As illustrated in FIG. 5, in some examples, the fluid dynamics and charge conservation subsystem 204 includes a fluid dynamics database 500 that is configured to store fluid dynamics models that describe the flow of the liquid into the liquid container during transfer thereof. Such fluid dynamics models encompass compressible v. incompressible flow, Newtonian v. non-Newtonian fluids, inviscid v. viscous v. Stokes flow, steady v. unsteady flow, laminar v. turbulent flow, reactive v. non-reactive flows, and the like.

Other fluid dynamics models include specific boundary conditions. Notably, the fluid dynamics database 500 may include boundary conditions for selection and definition by a user, such as: liquid container inlet boundary conditions at which liquid is transferred into the liquid container (e.g., inlet cylinder 404, FIGS. 4A-4C), air-liquid boundary conditions, conducting liquid container boundary wall conditions, dielectric liquid container boundary wall conditions, and mixed liquid container boundary conditions.

In some examples, interior walls or surfaces of the liquid container are perfectly conducting or are of a material having infinite electrical conductivity, i.e., zero resistivity. In some examples, the liquid container inlet is considered to be entirely fluid. In this manner, the liquid container inlet may be selected and identified using boundary conditions stored in the fluid dynamics database 500 in order to identify the volumetric flow rate and/or the volume charge density at the liquid container inlet boundary. In other examples, as indicated above, the liquid container inlet is selected and/or identified by the modeling subsystem 204, e.g., the geometry processing module 304 or the model parameters module 306.

In some examples, an air-liquid boundary exists between a top surface of the liquid transferred into the liquid container and the air in the liquid container. In some examples, it is assumed that the air-liquid boundary is a perfect insulator, where charge collects at the top surface but does not bleed up (i.e., discharge) to other boundaries through the air. In other examples, the presence of an isolated conductor may affect the assumption that the air-liquid boundary is a perfect insulator. An isolated conductor is any metal component in the liquid container that is not grounded, either by design or because of a mechanical failure. These conductors can charge up to high potentials through a number of mechanisms and create an arcing threat. Regardless, the assumption that the air-liquid boundary is a perfect insulator takes into account a constant potential throughout the isolated conductor, which has the effect of accounting for a first-order perturbation of electric fields and potentials due to the conductor's presence. However, this does not account for changes in these parameters arising from a charge distribution along the conducting surface.

In some examples, it is assumed that conducting liquid container boundary wall conditions are perfectly conducting. This may be defined via selection of a perfectly conducting boundary condition from the fluid dynamics database, and may be defined by an interior surface or wall of the liquid container having a surface charge of zero. As such, at each time step of the simulation, the surface charge of the liquid container boundary can be reset to zero.

In some examples, dielectric liquid container boundary wall conditions may be defined. More particularly, a dielectric wall(s) of the liquid container is an electrical insulator that can be polarized by an applied electric field. In some examples, surface charge builds up on the walls or surfaces of the liquid container (i.e., dielectric boundary) in the same way it does for an air-liquid boundary. Charge may be bled through the boundary by defining a capacitance according to the permittivity of the fluid and the thickness of a thin double-layer at the boundary. It is estimated that a thickness of a liquid layer of the boundary is on the order of about 50 µm. This capacitance is used to determine how much charge relaxes off of the surface, according to equation (1), which may be stored in the fluid dynamics database 500.

$$\rho_{s,t} = \rho_{s,t-1} + \sigma \vec{E} \cdot \vec{A} \Delta t - C \frac{dV}{dt} \tag{1}$$

Other fluid dynamics models, such as mixed liquid container boundary conditions, may also be stored in the fluid dynamics database 500 and may be either transmitted to or selected by a selection module 502. The selection module 502 is configured to select respective fluid dynamics models from the database 500 and transmit such fluid dynamics models to a code module 504. For example, the selection module 502 selects, or receives, fluid dynamics models for modeling momentum, boundary conditions, and volumetric flow rate during transfer of liquid into the liquid container. The code module 504 is configured to generate executable code in order to reproduce fluid dynamics during transfer of liquid into the liquid container. Using the selected fluid dynamics models from the database 500, the code module 504 is configured to generate the executable code or script that will that will be implemented during the simulation to reproduce the fluid dynamics of the liquid during the simulation. As such, the code module 504 is configured to output the executable code to a simulation setup module 506 for integration with the computer geometry model of the liquid container from the modeling subsystem 202.

FIG. 5 further illustrates an electrostatic charge transport model database 508 configured to store electrostatic charge transport models, e.g., governing equations, which may be used to solve for electrostatic build-up, transport, relaxation, and/or distribution of charge during transfer of a liquid into a liquid container. More particularly, the electrostatic charge transport models encompass conduction, convection, charge drift velocity due to ion mobility, and/or diffusion. Convection accounts for charge being transported along with the fluid itself. It may be especially important near the liquid container inlet, where a stream of highly-charged liquid enters the container. Charge mobility may be important in scenarios where the conductivity is very low or the electric field is very high. Charge density, or Gauss's Law, represents an exponential decay in time that uniformly reduces the charge density throughout the liquid container.

One exemplary electrostatic charge transport model that may be stored in the electrostatic charge transport model database 508 encompasses conduction, convection, charge drift velocity due to ion mobility, and/or diffusion and is provided in (2):

$$\frac{d\rho_e(\vec{r})}{dt} + \nabla \cdot \{\rho_e(\vec{r})\vec{v}(\vec{r}) + \rho_e(\vec{r})\mu \vec{E}(\vec{r}) - \nabla \rho_e D_e\} = \\ -\frac{\sigma}{\epsilon}\rho_e(\vec{r})\vec{J}(\vec{r}) = \sigma \vec{E}(\vec{r}) \quad (2)$$

In (2), the convection and mobility terms are solved as flux transport between the cells, and the ohmic relaxation $$-\frac{\sigma}{\epsilon}\rho_e(\vec{r})$$

is implemented as a charge sink. Notably, the diffusion coefficient $D_E$ is incorporated as a constant coefficient, but is a function of the electric field.

Other electrostatic charge transport models may also be stored in the electrostatic charge transport model database 508 and may be either transmitted to or selected by a selection module 510. The selection module 510 is configured to select respective electrostatic charge transport models from the database 508 and transmit such electrostatic charge transport models to a code module 512. The code module 512 is configured to generate executable code in order to reproduce electrostatic charge conservation during transfer of liquid into the liquid container. Using the selected electrostatic charge transport models from the database 508, the code module 512 is configured to generate the executable code or script that will be implemented during the simulation to reproduce the build-up, relaxation, and transportation of charge during the simulation. As such, the code module 512 is configured to output the executable code to the simulation setup module 506 for integration with the computer geometry model of the liquid container from the modeling subsystem 202. The integration of the executable code from the code modules 504, 512 and the computer geometric model of the liquid container and the model parameters are then configured to be output to the simulation subsystem 206.

Figure 6:
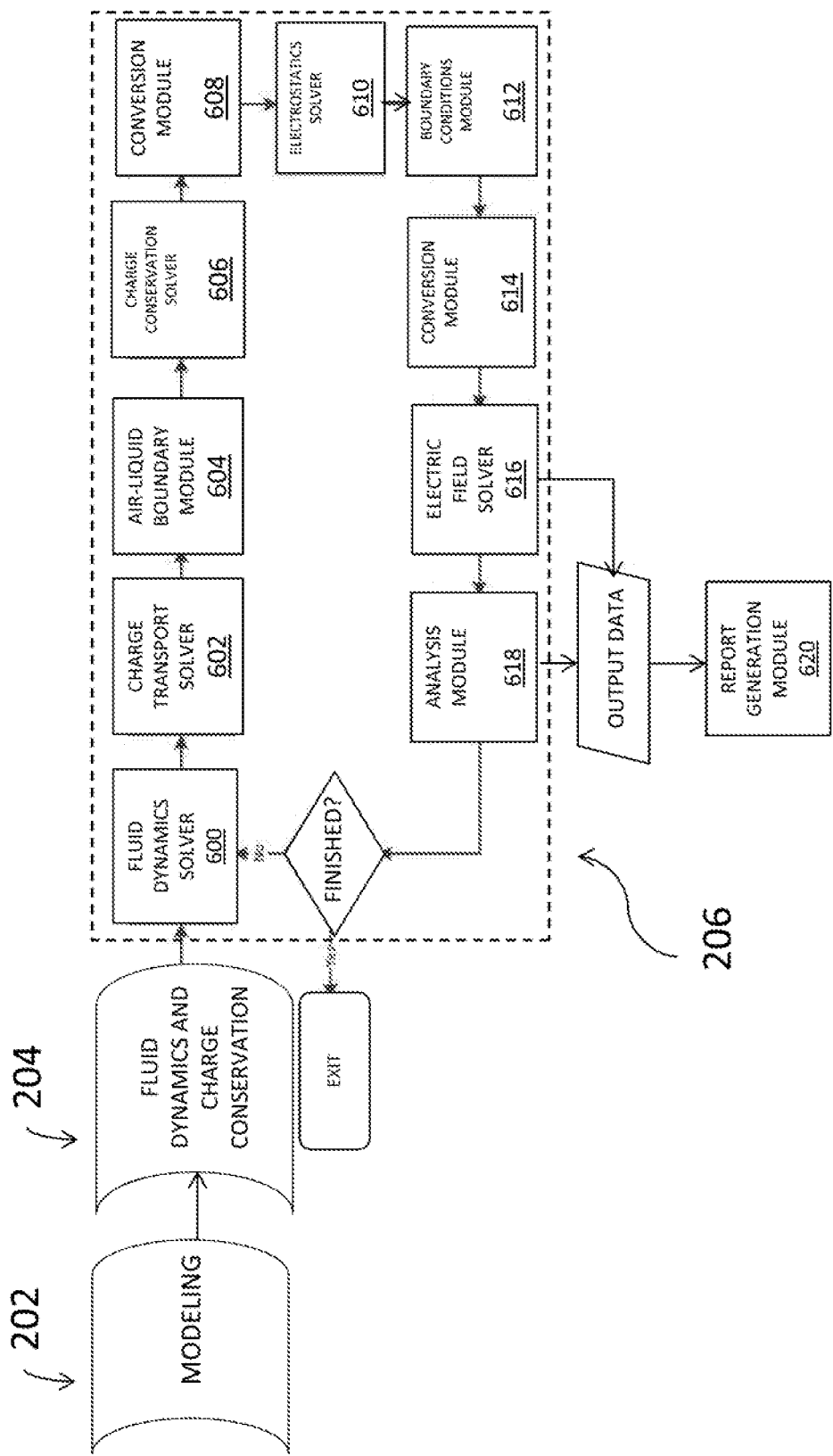
FIG. 6 is a block diagram that more particularly illustrates a simulation subsystem of the system of FIG. 2, according to example implementations of the present disclosure.

FIG. 6 is a block diagram that more particularly illustrates the simulation subsystem 206, according to some example implementations. The simulation subsystem 206 is configured to launch an iterative loop to perform a simulation of the transfer of liquid into the liquid container subject to the fluid dynamics and electrostatic charge conservation models from the subsystem 204, and iterate the simulation to make a refined prediction as to the electrostatic charges in the liquid container during the transfer of liquid. In this regard, the simulation subsystem 206 is configured to perform a series of calculations to predict the build-up, transport, and relaxation of the electrostatic charge during transport thereof using a finite volume method or some other parabolic-like partial differential equation solver combined with the appropriate numerical settings and input parameters by executing the executable code generated by the upstream modules.

As stated previously herein, the simulation subsystem 206 may comprise one or more modules that include a CFD software package, either a native software package, another available commercial package such as Flow3D or Ansys Fluent, or a combination thereof. Accordingly, in FIG. 6, the simulation subsystem 206 comprises one or more modules configured to execute one or more of the calculations required to predict the electrostatic charges. The loop may be launched upon initiation by a user of the software package, which will initiate the simulation of the liquid container filling with liquid. The loop may continue to iterate until the liquid container is filled to a predetermined level or until certain criteria of convergence are achieved, in particular with regard to the size of the residuals of solutions of the calculations being sufficiently small (below a certain tolerance) or sufficiently unchanged after subsequent calculation iterations (again below a specified tolerance). The convergence criteria are adjustable, depending on the needs of the user.

In some instances, the simulation subsystem 206 comprises a fluid dynamics solver 600 includes a CFD software package, such as Ansys Fluent, that is configured to access the executable code generated by the code module 504 to reproduce for and solve the fluid dynamics models of the liquid as the liquid is being transferred into the liquid container modeled by the modeling subsystem 202. The executable code provided to the fluid dynamics solver 600 may include all of the numerical processing specifications necessary to accurately reproduce or simulate the fluid dynamics from a physics and computational perspective (e.g., momentum, volumetric flow rate, boundary conditions, and/or volume charge density).

The simulation subsystem 206 may also comprise a charge transport solver 602 that includes a native software package that is configured to access the executable code generated by the code module 512 to reproduce for and solve the electrostatic charge transport models (i.e., governing equations) of the liquid as the liquid is being transferred into the liquid container modeled by the modeling subsystem 202. The executable code provided to the charge transport solver 602 may include all of the user defined functions or equations, such as (1), that enable the charge transport solver 602 to continuously solve for charge transport during, and after, the transfer of liquid into the liquid container.

An air-liquid boundary module 604 may be configured to calculate the air-liquid boundary conditions within the liquid container during the transfer of liquid into the liquid container, using the assumption that the air-liquid boundary is a perfect insulator. Otherwise, the air-liquid boundary module 604 uses the assumption that the air-liquid boundary is not a perfect insulator when an isolated conductor is present. More particularly, the air-liquid boundary module 604 is configured to calculate an interface between a top surface of the liquid transferred into the liquid container and the air present in the liquid container at each time step. As referenced above, the liquid and the air are defined in the modeling subsystem 202 based on the material and any inherent properties provided therewith (e.g., viscosity, density, standard state enthalpy, etc.). In some examples, the liquid is fuel such as kerosene, such that the air-liquid boundary module 604 is configured to calculate the air-fuel boundary within the liquid container.

The air-liquid boundary module 604 is configured to utilize equations (3)-(5) to calculate the volume fraction of the liquid transferred to the liquid container, noting that all volume fractions add to unity:

$$\frac{\partial \alpha_q}{\partial t} + \vec{v} \cdot \nabla \alpha_q = 0 \quad (3)$$

$$\sum_{q=1}^{n} \alpha_q = 1 \quad (4)$$

$$\frac{\partial}{\partial t}(\rho \vec{v}) + \nabla \cdot (\rho \vec{v}\vec{v}) = -\nabla p + \nabla \cdot \left[\mu(\nabla \vec{v} + \nabla \vec{v}^T)\right] + \rho \vec{g} + \vec{F} \quad (5)$$

where $\alpha_q$ represents the volume fraction of the qth phase, $\rho$ represents density, p is static pressure, $\mu$ is molecular viscosity, $\rho \vec{g}$ is gravitational body force, and $\vec{F}$ represents external body forces. In this manner, the air-liquid boundary module 604 is configured to provide a volume charge density $\rho_v$, with units C/m$^3$, determined as the liquid being transferred enters the container.

A charge conservation solver 606 is utilized to update a surface charge of the liquid along a top surface of the liquid between the air-liquid boundary. At interfaces between the top surface of the liquid and air within the liquid container, or between the top surface of the liquid and a dielectric wall, charge can accumulate in a thin layer. This is treated as a surface charge density $\rho_s$, having units C/m$^2$. Notably, the surface charge density along the top surface of the liquid and at dielectric boundaries is an important component of predicting electrostatic charges in a liquid container because it can lead to a potentially undesirable condition known as propagating brush discharge. More particularly, the surface charge on top of the liquid makes a substantial contribution to the electric field in the ullage (i.e., part of the container filled with air, not yet fueled), which is a contributor to the potentially undesirable condition of arcing.

In some examples, the charge conservation solver 606 continuously zeros out the surface charge density at each time step at any cell within the liquid container that is not an air-liquid interface or a liquid-boundary interface. In other examples, when the liquid container is simply assumed as a perfect conductor, the surface charge at that boundary is set to zero. Where the charge conservation solver 606 is configured to assess the surface charge, the charge conservation solver 606 is configured to do so using two physical mechanisms to reproduce the build-up and relaxation of surface charge during the simulation at each time step. Initially, when the electric field would conduct charge through the surface to another cell, but instead meets a non-conducting interface, surface charge is created according to the normal component of the electric field. Explicitly, the charge conservation solver 606 solves equation (6) to determine the surface charge density:

$$\rho_{s,t} = \rho_{s,t-1} + \sigma \vec{E} \cdot \vec{A} \Delta t \quad (6)$$

where $\rho_{s,t}$ represents the surface charge density (in C/m$^2$) at time step t, $\vec{A}$ is the normal to the air-fluid interface, and $\Delta t$ is the length of a time step.

The charge conservation solver 606 is also configured to solve for surface charge using a second mechanism, which may be specific to the software package in which the charge conservation solver 606 is being implemented. For example, where the charge conservation solver 606 is being implemented in Ansys Fluent, the charge conservation solver 606 may solve for surface charge transport using a method specific to a Volume of Fluid solution used by Ansys Fluent. Specifically, as the cells transition from partially full (thus containing an interface) to entirely full (and no longer part of the air-liquid boundary), the remaining surface charge transitions to any neighboring cells which now contain an interface. This is roughly equivalent to transport by convection at the surface.

A conversion module 608 is configured to translate the data from upstream modules 600-606 into a format that can be output to another software package. For example, the conversion module 608 is configured to translate a representation of electrical properties from an element-based distribution for the CFD solution to a node-based distribution of sources for the electrostatics solution, such that the data can be output to another software package.

An electrostatics solver 610 is configured to receive the data extracted by the conversion module 608. The electrostatics solver 610 includes a native software package capable of solving Poisson's Equation to determine the electric potential at each of the nodes of the finite element model of the liquid container. As such, the electrostatics solver 610 is configured to solve for Poisson's Equation in the matrix form of equation (7):

$$\nabla^2 \phi(\vec{r}) = -\frac{\rho_e(\vec{r})}{\epsilon} \quad (7)$$

In some examples, a dielectric constant of the liquid container surface may be present such that a stiffness matrix may be modified in the electrostatics solver 610 to create a resistor-capacitor (RC) circuit that describes the charge transfer into the boundary. As such, equation (7) may be modified to account for the charge transfer into the boundary, rather than keep the assumption that the tank boundary is perfectly conducting.

After calculating Poisson's Equation, the simulation subsystem 206 is configured to update the calculations previously calculated in modules 600-608. More particularly, in a boundary conditions module 612 including the native software package used for instance in module/solvers 602-608, the converted electric potential calculated from the electrostatics solver 610 is received thereby and is used to update the boundary conditions inside the liquid container. For example, the calculated electric potential may be used to update the liquid container inlet boundary conditions, the air-liquid boundary conditions, the conducting liquid container boundary wall conditions, dielectric liquid container boundary wall conditions, and/or the mixed liquid container boundary conditions. In other examples, updated boundary conditions are used, for example, to zero out the surface charge density in equation (6) if the fluid has moved such that the element no longer contains a fluid/air interface.

A conversion module 614 is then configured to translate the data from module 612 into a format that can be output to another software package. In some examples, the conversion module 614 is the same conversion module as that of conversion module 608. In this manner conversion module 608 is configured to convert data into formats suitable for at least two different software packages. In another example, the conversion module 614 is different than the conversion module 608. Regardless, the conversion module 614 is configured to convert the node-based solution of solver 610, module 612 back into an element based representation for output to another software package, such as fluid dynamics solver 600.

In some examples, the calculated electric potential solved for by the electrostatics solver 610 can be used to determine the electric field. As such, an electric field solver 616 can be configured to utilize the electrostatic charge transport models to solve for each node of the nodes of the finite element model of the computer geometric model of the liquid container. Specifically, the electric field solver 616 is configured to retrieve the electric potential data at each node of the nodes, and integrate the electric potential data at each node of the nodes with the electrostatic charge transport models (e.g., equation (2)) to solve for the electric field. In this manner, electrostatic charge conservation during the transfer of liquid into the liquid container is updated.

The electric field solver 616 can further be configured to output the electric field calculated thereby as an informational visualization to be plotted as a function of time. The electric field and electric potential, fluid locations, surface and volume charge distributions, and the like may be automatically created at different time steps based on the data output from the calculation of the electric field solver 616. Informational visualizations in the form of videos and still shots that continuously predict electrostatic charges based on fluid levels, charge densities, and electric potentials during the transfer of liquid into the liquid container may be shown in real time (see, e.g., FIGS. 7A, 7B).

Upon determining the electric field, the calculated electric field may be transmitted to an analysis module 618 for further calculation. The analysis module 618 is configured to take the electric field and update any of the fluid dynamics and/or electrostatic charge transport models based on the calculated electric field in order to produce a prediction of the electrostatic charges in the liquid container during transfer of the liquid therein. The analysis module 618 is configured to analyze the profile of the simulation to determine if the simulation need be iterated for another loop, depending on a volume of fill of the liquid container and/or a run time of time of the simulation. Where the analysis module determines that the simulation is not finished, i.e., the liquid container is not yet filled, the analysis module 618 will iterate the simulation again to update the electrostatic charge conservation to thereby refine the prediction of the electrostatic charges in the liquid container as it continues to receive liquid. However, if the analysis module 618 determines that the simulation is finished, i.e., the liquid container is filled to the predetermined level, then the simulation will stop and the final prediction of the electrostatic charges will be output as described below.

In some exemplary embodiments, the analysis module 618 is configured to iterate the simulation for another loop, even after the volume of fill of the liquid container is achieved. This may be done in order to solve for charge transport (e.g., solver 602) after the transfer of liquid into the liquid container. In this manner, the simulation may continue to iterate, even though transfer of liquid has ceased, in order to understand how much time it takes for any potential threats to dissipate within the tank.

A report generation module 620 is generally configured to graph the statistics and various results including the still shots and videos that may also be collected into a report, in a standard format such as PowerPoint or PDF. Finally, this quantitative information about the predicted electrostatic charges may be passed on to a user in the form of results presented to display the impact of the current design. Additionally, basic statistics are gathered. FIGS. 7A-7C illustrate three example graphical outputs 700-704, respectively. FIG. 7A illustrates an exemplary time step sample of the electric potential results calculated during the simulation at a specific region (top center) of the liquid container. FIG. 7B illustrates an exemplary time step sample of the electric field results calculated during the simulation at a specific region (top center) of the liquid container. FIG. 7C illustrates a volume charge density throughout the finite element model of the liquid container at a moment in time during the simulation. Accordingly, utilizing the inputs generated by the electric field solver 616 and/or the analysis module 618, desired quantities to be measured may be calculated and accumulated in an automated way. These results are collected in the report generation module 620.

In instances where the results regarding the prediction of the electrostatic charges indicate that the design of the liquid container is sufficient, the design of the liquid container is thereby certified for manufacture. The analysis module 618 may be further configured to output the design of the liquid container in at least one instance to a manufacturing system for production thereof according to the certified design. As, in these instances, the design of the liquid container is identified as being certified for implementation readiness and optimization with regard to electrostatic charges.

In instances where the results regarding the prediction of the electrostatic charges indicate that the design of the liquid container is insufficient, a modified design of the liquid container may be produced. In other examples, the modified design may be produced elsewhere and supplied back to the system. The modified design is based on the prediction of electric potentials and surface charge distributions within the liquid container in respective locations thereof. Quantitative information may be output in the form of results presented to display the impact of the current design of the liquid container. The system may be configured to generate a modified computer geometric model of the liquid container according to the modified design; and re-execute the simulating application via the computer processor configured to access the modified computer geometric model and the executable code.

By understanding the electrostatic charges within the liquid tank during transfer of liquid, as indicated by the reports, the designer will know which components of the liquid tank or the tank itself would benefit the most for redesign or relocation. The reports mapping out the various results generated from the simulation can be used to predict areas where electrostatic charges are the lowest (e.g., where surface charge distributions are the lowest). These design changes can then be implemented to improve the reliability of the design and minimize risk, while iterating use of the tool for iterative optimization if necessary.

FIG. 8 is a flowchart illustrating various steps in a method 800 for predicting electrostatic charges in a liquid container. As shown at block 802, the method includes generating a computer geometric model of the liquid container according to a design of the liquid container. As shown in block 804, the method includes generating executable code to reproduce fluid dynamics and electrostatic charge conservation during transfer of liquid into the liquid container. The method includes executing a simulating application, as shown at block 806. Executing the simulation application includes performing a simulation of the transfer of liquid into the liquid container subject to the fluid dynamics and electrostatic charge conservation, and from the simulation, producing a prediction of electrostatic charges in the liquid container during the transfer of liquid as well as iterating the simulation to update the electrostatic charge conservation to thereby refine the prediction of electrostatic charges in the liquid container during the transfer of liquid. And the method includes outputting the prediction of electrostatic charges in the liquid container to enable certification of the design of the liquid container based thereon, as shown in block 808.

According to example implementations of the present disclosure, the system 200, as illustrated in FIG. 2, and its subsystems including the modeling subsystem 202, the fluid dynamics and charge conservation subsystem 204 and simulation subsystem 206 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 9 illustrates an apparatus 900 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 902 (e.g., processor unit) connected to a memory 904 (e.g., storage device).

The processor 902 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 904 (of the same or another apparatus).

The processor 902 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 904 is generally any piece of computer hardware that is capable of storing information such as, for example, data, computer programs (e.g., computer-readable program code 906) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 904, the processor 902 may also be connected to one or more interfaces for displaying, transmitting and/or receiving information. The interfaces may include a communications interface 908 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 910 and/or one or more user input interfaces 912 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by processor, or storage of instructions in a computer-readable storage medium, supports combinations of operations for performing the specified functions. In this manner, an apparatus 900 may include processing circuitry including a processor 902 and a computer-readable storage medium or memory 904 coupled to the processor, where the processor is configured to execute computer-readable program code 906 stored in the memory. It will also be understood that one or more functions, and combinations of functions, may be implemented by special purpose hardware-based computer systems and/or processor which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of predicting electrostatic charges in a liquid container, the method comprising:
   executing a simulating application, via a computer processor configured to access a computer geometric model of the liquid container and executable code to reproduce fluid dynamics and electrostatic charge conservation, to at least:
   perform a simulation of a transfer of liquid into the liquid container subject to the fluid dynamics and electrostatic charge conservation, and from the simulation, produce a prediction of electrostatic charges in the liquid container during the transfer of liquid; and
   iterate the simulation to update the electrostatic charge conservation to thereby refine the prediction of electrostatic charges in the liquid container during the transfer of liquid.

2. The method of claim 1, further comprising generating the executable code to reproduce the fluid dynamics and the electrostatic charge conservation during the transfer of the liquid into the liquid container, wherein generating the executable code includes receiving selected fluid dynamics models from a database of fluid dynamics models including momentum, boundary conditions, volumetric flow rate, or volume charge density.

3. The method of claim 2, wherein generating the executable code includes receiving selected electrostatic charge transport models representative of electrostatic charge conservation from a database of electrostatic charge transport models including conduction, convection, diffusion, or mobility.

4. The method of claim 3, wherein executing the simulating application includes solving the selected electrostatic charge transport models during and after the transfer of the liquid into the liquid container.

5. The method of claim 4, further comprising generating the computer geometric model of the liquid container according to a design of the liquid container, wherein generating the computer geometric model includes generating a finite element model comprising a system modeled by a set of finite elements interconnected by nodes.

6. The method of claim 5, wherein solving the selected electrostatic charge transport models includes, for each node of the nodes, extracting data from the node and solving for an electric potential at the node using on the electrostatic charge transport models during transfer of liquid into the liquid container.

7. The method of claim 6, wherein executing the simulating application to iterate the simulation includes retrieving the electric potential data at each node of the nodes, and integrating the electric potential data at each node of the nodes with the electrostatic charge transport models such that electrostatic charge conservation during the transfer of liquid into the liquid container is updated.

8. The method of claim 1, wherein executing the simulating application includes calculating boundary conditions inside the liquid container including liquid container inlet boundary conditions at which liquid is transferred into the liquid container, air-liquid boundary conditions, conducting liquid container boundary wall conditions, dielectric liquid container boundary wall conditions, and mixed liquid container boundary conditions.

9. The method of claim 1, further comprising outputting the prediction of electrostatic charges in the liquid container to enable certification of the design of the liquid container based thereon, wherein outputting the prediction of electrostatic charges in the liquid container includes, in at least one other instance:
   producing a modified design of the liquid container based on the prediction of electrostatic charges in the liquid container;
   generating a modified computer geometric model of the liquid container according to the modified design; and
   re-executing the simulating application via the computer processor configured to access the modified computer geometric model and the executable code.

10. An apparatus for predicting electrostatic charges in a liquid container, the apparatus comprising a processor and a memory storing executable instructions that, in response to execution by the processor, cause the apparatus to at least:
   execute a simulating application, via the processor configured to access a computer geometric model of the liquid container and executable code to reproduce fluid dynamics and electrostatic charge conservation, to at least:
   perform a simulation of a transfer of liquid into the liquid container subject to the fluid dynamics and electrostatic charge conservation, and from the simulation, produce a prediction of electrostatic charges in the liquid container during the transfer of liquid; and iterate the simulation to update the electrostatic charge conservation to thereby refine the prediction of electrostatic charges in the liquid container during the transfer of liquid.

11. The apparatus of claim 10, wherein the apparatus is further caused to generate the executable code to reproduce the fluid dynamics and the electrostatic charge conservation during the transfer of the liquid into the liquid container, wherein the apparatus being configured to generate the executable code includes being caused to receive selected fluid dynamics models from a database of fluid dynamics models including momentum, volumetric flow rate, boundary conditions, or volume charge density.

12. The apparatus of claim 11, wherein the apparatus being configured to generate the executable code includes being caused to receive selected electrostatic charge transport models representative of electrostatic charge conservation from a database of electrostatic charge transport models including conduction, convection, diffusion, or mobility.

13. The apparatus of claim 12, wherein the apparatus being configured to execute the simulating application includes being caused to solve the selected electrostatic charge transport models during and after the transfer of the liquid into the liquid container.

14. The apparatus of claim 13, wherein the apparatus is further caused to generate the computer geometric model of the liquid container according to a design of the liquid container, wherein the apparatus being configured to generate the computer geometric model includes being caused to generate a finite element model comprising a system modeled by a set of finite elements interconnected by nodes.

15. The apparatus of claim 14, wherein the apparatus being configured to solve the selected electrostatic charge transport models during transfer of liquid into the liquid container includes being caused to, for each node of the nodes, extract data from the node and solve for an electric potential at the node using on the electrostatic charge transport models during transfer of liquid into the liquid container.

16. The apparatus of claim 15, wherein the apparatus being configured to execute the simulating application to iterate the simulation includes being caused to retrieve the electric potential data at each node of the nodes, and integrate the electric potential data at each node of the nodes with the electrostatic charge transport models such that electrostatic charge conservation during the transfer of liquid into the liquid container is updated.

17. The apparatus of claim 10, wherein the apparatus being configured to execute the simulating application includes being caused to calculate boundary conditions inside the liquid container including liquid container inlet boundary conditions at which liquid is transferred into the liquid container, air-liquid boundary conditions, conducting liquid container boundary wall conditions, dielectric liquid container boundary wall conditions, and mixed liquid container boundary conditions.

18. The apparatus of claim 10, wherein the apparatus is further caused to output the prediction of electrostatic charges in the liquid container to enable certification of the design of the liquid container based thereon, wherein being configured to output the prediction of electrostatic charges in the liquid container includes being caused to, in at least one other instance:

produce a modified design of the liquid container based on the prediction of electrostatic charges in the liquid container;

generate a modified computer geometric model of the liquid container according to the modified design; and re-execute the simulating application via the computer processor configured to access the modified computer geometric model and the executable code.

19. A computer-readable storage medium that is non-transitory and has computer-readable program code portions stored therein that in response to execution by a processor, cause an apparatus to at least:

execute a simulating application, via the processor configured to access a computer geometric model of the liquid container and executable code to reproduce fluid dynamics and electrostatic charge conservation, to at least:

perform a simulation of a transfer of liquid into the liquid container subject to the fluid dynamics and electrostatic charge conservation, and from the simulation, produce a prediction of electrostatic charges in the liquid container during the transfer of liquid; and iterate the simulation to update the electrostatic charge conservation to thereby refine the prediction of electrostatic charges in the liquid container during the transfer of liquid.

20. The computer-readable storage medium of claim 19, wherein the apparatus is further caused to generate the executable code to reproduce the fluid dynamics and the electrostatic charge conservation during the transfer of the liquid into the liquid container, wherein the apparatus being configured to generate the executable code includes being caused to receive selected fluid dynamics models from a database of fluid dynamics models including momentum, boundary conditions, volumetric flow rate, or volume charge density.

21. The computer-readable storage medium of claim 20, wherein the apparatus being configured to generate the executable code includes being caused to receive selected electrostatic charge transport models representative of electrostatic charge conservation from a database of electrostatic charge transport models including conduction, convection, diffusion, or mobility.

22. The computer-readable storage medium of claim 21, wherein the apparatus being configured to execute the simulating application includes being caused to solve the selected electrostatic charge transport models during and after the transfer of the liquid into the liquid container.

23. The computer-readable storage medium of claim 22, wherein the apparatus is further caused to generate the computer geometric model of the liquid container according to a design of the liquid container, wherein the apparatus being configured to generate the computer geometric model includes being caused to generate a finite element model comprising a system modeled by a set of finite elements interconnected by nodes.

24. The computer-readable storage medium of claim 23, wherein the apparatus being configured to solve the selected electrostatic charge transport models during transfer of liquid into the liquid container includes being caused to, for each node of the nodes, extract data from the node and solve for an electric potential at the node using on the electrostatic charge transport models during transfer of liquid into the liquid container.

25. The computer-readable storage medium of claim 24, wherein the apparatus being configured to execute the simulating application to iterate the simulation includes being caused to retrieve the electric potential data at each node of the nodes, and integrate the electric potential data at each node of the nodes with the electrostatic charge transport models such that electrostatic charge conservation during the transfer of liquid into the liquid container is updated.

26. The computer-readable storage medium of claim 25, wherein the apparatus being configured to execute the simulating application includes being caused to calculate boundary conditions inside the liquid container including liquid container inlet boundary conditions at which liquid is transferred into the liquid container, air-liquid boundary conditions, conducting liquid container boundary wall conditions, dielectric liquid container boundary wall conditions, and mixed liquid container boundary conditions.

27. The computer-readable storage medium of claim 26, wherein the apparatus is further caused to output the prediction of electrostatic charges in the liquid container to enable certification of the design of the liquid container based thereon, wherein being configured to output the prediction of electrostatic charges in the liquid container includes being caused to, in at least one other instance:
produce a modified design of the liquid container based on the prediction of electrostatic charges in the liquid container;
generate a modified computer geometric model of the liquid container according to the modified design; and
re-execute the simulating application via the computer processor configured to access the modified computer geometric model and the executable code.

* * * * *